No. 800,919. PATENTED OCT. 3, 1905.
G. HOEPNER.
MACHINE FOR GRADING MATERIALS.
APPLICATION FILED FEB. 1, 1904.
2 SHEETS—SHEET 1.
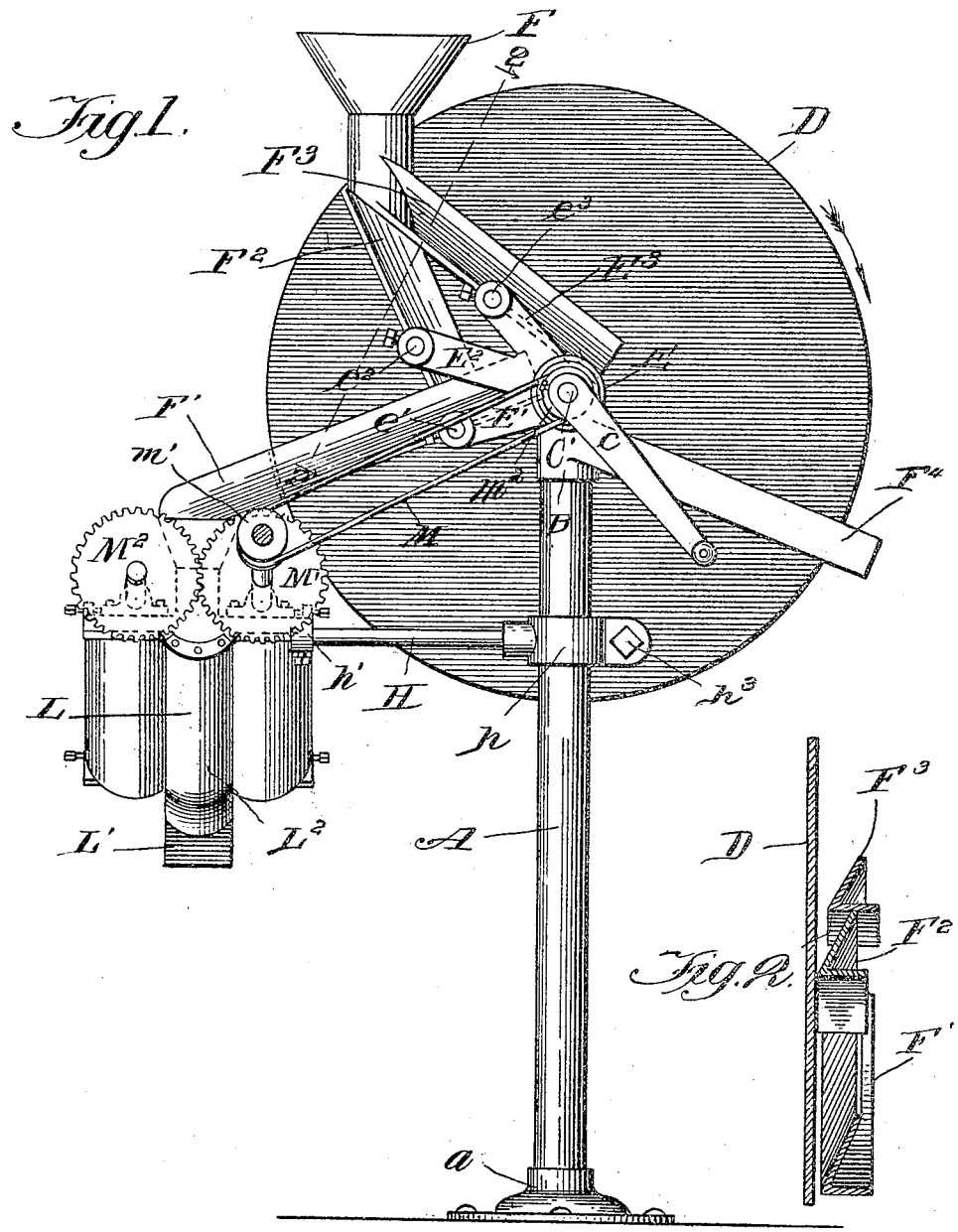

No. 800,919. PATENTED OCT. 3, 1905.
G. HOEPNER.
MACHINE FOR GRADING MATERIALS.
APPLICATION FILED FEB. 1, 1904.
2 SHEETS—SHEET 2.
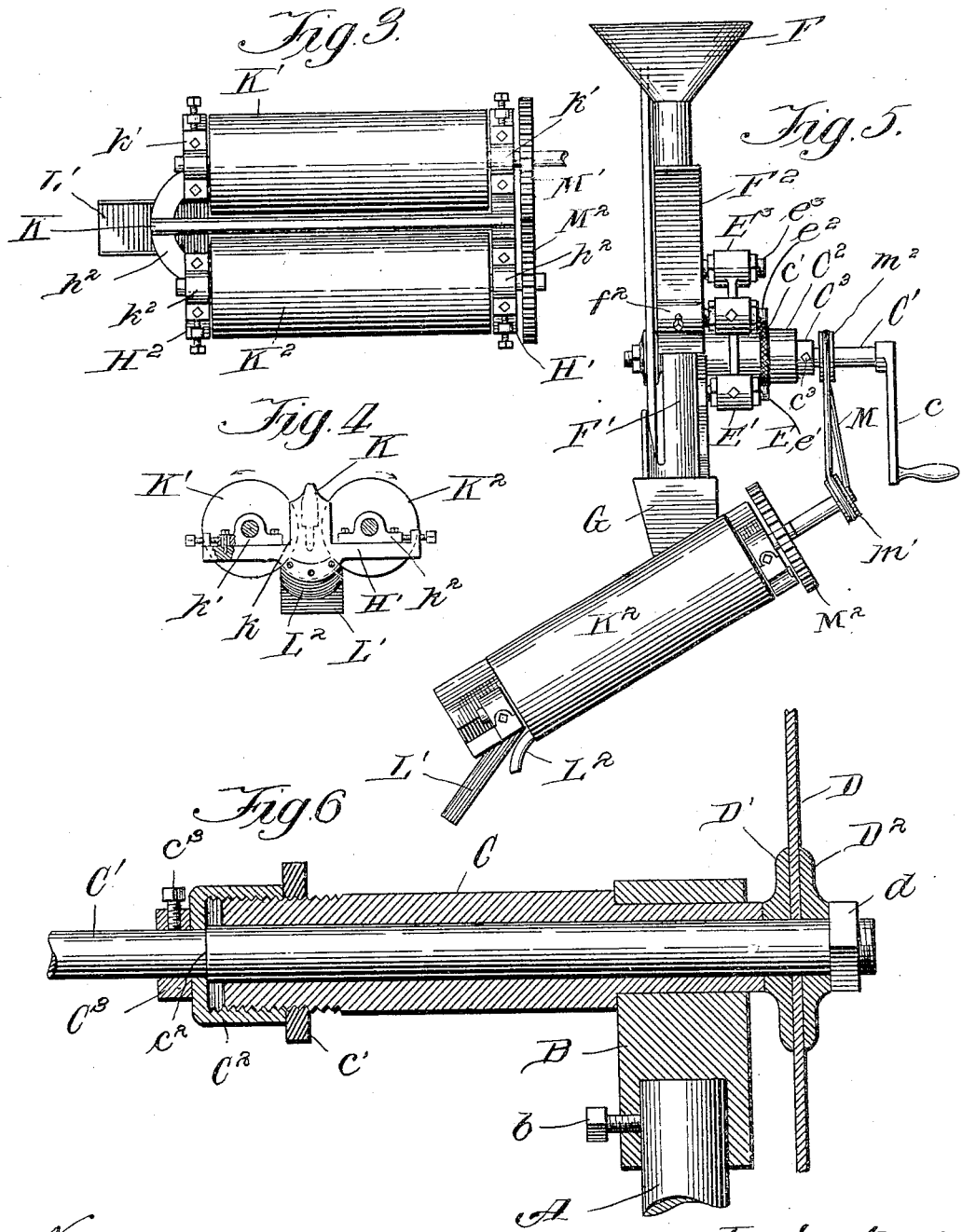

UNITED STATES PATENT OFFICE.

GEORGE HOEPNER, OF CHICAGO, ILLINOIS.

MACHINE FOR GRADING MATERIALS.

No. 800,919. Specification of Letters Patent. Patented Oct. 3, 1905.

Application filed February 1, 1904. Serial No. 191,415.

*To all whom it may concern:*

Be it known that I, GEORGE HOEPNER, a citizen of the United States, residing at Chicago, county of Cook, State of Illinois, have invented a certain new and useful Improvement in Machines for Grading Materials; and I declare the following to be a full, clear, and exact description of the invention, such as will enable others skilled in the art to which it pertains to make and use the same, reference being had to the accompanying drawings, which form a part of this specification.

My invention relates in general to machines for grading or separating granular material, and more particularly to a machine for calipering cereals—such, for instance, as grain.

It is desirable for various purposes to separate granular material according to the thicknesses of the component particles. In planting cereals better results are obtained by using as seed kernels or grains of normal size and shape than when unassorted kernels are planted. Experiments have conclusively established the fact that a largely-increased yield is obtained when only selected kernels of corn are planted over the yield resulting from using as seed the ordinary run of kernels, many of which on each cob, especially near the ends thereof, are imperfect. It has heretofore, so far as I am aware, been necessary to pick out by hand the perfect kernels to be used as seed.

The primary object of my invention is to provide a machine for calipering granular material in general, and especially for grading cereals, whereby the tedious process heretofore necessary of selecting by hand the perfect kernels or grains of cereals for planting is obviated.

A still further object of my invention is to provide a machine of the character described which will be simple in construction, inexpensive in manufacture, and efficient in use.

My invention, generally described, consists in an inclined chute formed between converging surfaces, the adjacent edges of which are spaced apart a predetermined distance, one of the surfaces having a path of movement in the direction of the divergence of the surfaces, so that the material to be graded when delivered upon the upper end of the chute will be agitated as it passes down the chute by the moving surface and the smaller particles allowed to pass through the space between the surfaces forming the chute, while the larger particles remain in the chute and are delivered from the lower end thereof.

My invention will be more fully described hereinafter with reference to the accompanying drawings, in which—

Figure 1 is a side elevational view; Fig. 2, a sectional view on line 2 2, Fig. 1; Fig. 3, a plan view of the oppositely-rotating rollers; Fig. 4, an end view of the rollers; Fig. 5, an elevational view looking from the left in Fig. 1, and Fig. 6 a fragmentary vertical sectional view on an enlarged scale.

The same reference characters are used to designate the same parts in the several figures of the drawings.

A designates a post or standard which is supported by any suitable means—such, for instance, as a base $a$.

B designates a bearing secured to the upper end of the post by any suitable means—such, for instance, as a set-screw $b$. Rigidly supported in the bearing B is a sleeve C, within which is rotatably mounted a shaft $C'$. One end of the shaft $C'$ has fixed thereto means for imparting rotation to the shaft—such, for instance, as a crank-handle $c$. In order that the shaft $C'$ may be longitudinally adjusted within the sleeve $C'$, a shoulder $c^2$ is provided on the shaft adjacent to the end of the sleeve which is engaged by an interiorly-screw-threaded cap $C^2$, which surrounds and is in screw-threaded engagement with the adjacent end of the sleeve. The lock-nut $c'$ also surrounds and is in screw-threaded engagement with the sleeve C and engages the end of the cap $C^2$. A collar $C^3$ surrounds the shaft C adjacent to the cap $C^2$ and retains the latter between the same and the shoulder $c^2$ on the shaft. Any suitable fastening device may be provided for fastening the collar upon the shaft— such, for instance, as a clamping-screw $c^3$. Fixed upon the end of the shaft $C^2$ opposite to that on which the crank-handle is secured is a disk D. Any suitable means may be provided for securing the disk on the shaft—such, for instance, as collars $D'$ and $D^2$, the former of which is fixed upon the shaft, while the latter is forced against the adjacent surface of the disk, so as to clamp the disk between the collars by means of a nut $d$. Surrounding and mounted upon the sleeve C and interposed between the lock-nut $c'$ and bearing B is a second sleeve E, from which extend radial brackets E', $E^2$, and $E^3$. The outer sleeve E may be rotatably adjusted about the inner sleeve and secured to any desired position. The lower bracket E' supports at its outer end a rod $e'$, to which is secured a guiding-surface F', extending in a downwardly-inclined position and spaced away from the disk D a predetermined distance, such distance being adjustable, owing to the rod $e'$ being adjustably supported in the bracket E' by means of a clamp-screw. The intermediate bracket $E^2$ also adjustably supports at its outer end a rod $e^2$, to which is secured a guide $F^2$, inclined in an upwardly direction and terminating in close proximity to the adjacent surface of the disk D. The inclination of the guide $F^2$ may be also adjusted by adjusting the rod $e^2$ within the supporting-bracket $E^2$. The upper bracket $E^3$ supports an inclined guide $F^3$ through the medium of the interposed rod $e^3$, adjustably supported in the outer end of the bracket. The edge of the guide $F^3$ adjacent to the surface of the disk D is spaced apart therefrom a slightly greater distance than the space between the lower guide F' and the disk.

F designates a hopper communicating at its lower end with the chute formed between the guide $F^3$ and the adjacent surface of the disk. This hopper may be conveniently supported upon the outer end of the guide $F^3$.

$F^4$ designates a chute for receiving material delivered from the lower end of the chute formed between the guide $F^3$ and the disk and delivering the same to a point at one side of the machine.

Located below the lower end of the guide F' is a pair of reversely-rotating rollers K' and $K^2$. Spindles extend through the rollers and are journaled in pairs of bearings $k'$ $k'$ and $k^2$ $k^2$. The bearings $k'$ and $k^2$ at the upper ends of the rollers are supported upon a bar H', which in turn is supported at the outer end of a rod H by any suitable means—such, for instance, as a collar $h$ and set-screw extending therethrough into engagement with the rod. The rod H is secured to the post A by means of a split sleeve H, which surrounds the post and is clamped thereon by means of a clamp-screw $h^3$.

The bearings $k'$ and $k^2$, mounted upon the bar H', are adjustable, as clearly shown in Fig. 4, by means of set-screws passing through ears at the ends of the bar H' and engaging the adjacent ends of the bearings. The screws which secure the bearings to the bar H' pass through elongated slots in the bearings, so as to permit the bearings to be so adjusted upon the bar that the rollers can be located nearer or farther away from each other. The bar $H^2$, upon which the lower bearings $k'$ and $k^2$ of the rollers are supported, is formed in two parts spaced from each other and rigidly united by a yoke $h^2$. The bearings $k'$ and $k^2$ are adjustably mounted upon the bar $H^2$ in the same manner as the opposite bearings are adjustably mounted upon their supporting-bar H'.

Interposed between the adjacent surfaces of the rollers K' and $K^2$ is a partition K, supported at its upper end by means of a bracket $k$, mounted upon the bar H' and its lower end upon the yoke $h^2$. Located beneath the partition K and supported at its upper end upon the bar H' is a trough L, which extends the length of the rollers and terminates in a downwardly-extending spout $L^2$. A second spout L' is located above the spout $L^2$ and is supported between the adjacent ends of the two parts of the bar $H^2$. The upper end of the spout L' is located in a line with the axes of the rollers K' and $K^2$, so as to receive material which is too large to pass between the rollers and the interposed partition.

Meshed gear-wheels M' and $M^2$ are fixed upon the spindles which support the rollers, one of the spindles being extended upwardly and provided with a pulley $m'$, around which a belt M passes, and rotatively connects the same with the shaft C' by means of the pulley $m^2$, fixed upon said shaft.

G designates a hopper supported at the lower end of the guide F' and terminating at a point immediately above the space between the upper ends of the rollers K' and $K^2$.

The operation of my invention is as follows: The shaft C' is rotated by applying power to the crank $c$ to move the disk D in the direction indicated by the arrow in Fig. 1—that is, in the direction of the divergence of the walls of the chutes formed between the several guides and adjacent surface of the disk. The rotation of the shaft C' through the interposed belt and pulleys rotates the rollers K' and $K^2$ through the meshed gear-wheels in the direction of the arrows in Fig. 4—that is, so that the surfaces adjacent to the partition K move upwardly. The material which is to be separated is delivered to the hopper F and passes therefrom into the chute formed between the upper guide $F^3$ and the adjacent surface of the disk D. The particles of the material which are too large to pass between the guide $F^3$ and the disk are guided along to the lower end of the chute and fall therefrom upon the lower chute $F^4$ and are delivered therefrom preferably into a receptacle provided to receive the same. The particles of the material which are sufficiently small to pass between the guide $F^3$ and disk are directed by the guide $F^2$ to the upper end of the chute formed between the guide F' and disk. The particles delivered upon the upper end of the chute formed between the guide F' and the disk which are smaller than the open space between the guide and disk fall downwardly, while the particles which are too large to fall between the guide and disk are delivered from the lower end of the chute so formed through the hopper G to a point above and between the upper ends of the pair of rollers K' and K². The particles so delivered to the pair of rollers are separated according to their size, the smaller ones passing between the partition K and the adjacent surfaces of the guide-rollers and are discharged from the spout L² at the lower end of the chute L, while the larger particles, which cannot pass between the rollers and the partition, are delivered from the lower ends of the rollers onto the spout L'. The rotation of the disk D in an upwardly direction with respect to the chute formed between the same and the guides agitates the material, so that any particles which are of a thickness less than the spaces between the guides and disk are so turned that they will fall through the spaces between the respective guides and the disk. The rotation of the rollers in reverse directions also insures all particles of a width less than the space between the rollers and the partition K passing into the chute L, so that only particles every dimension of which is greater than the spaces between the rollers and partition are guided to the spout L'.

While I have described the apparatus as comprising not only the chutes formed between the guides and disk D, but also the chute formed between the oppositely-rotating rollers and interposed partition, yet it is evident that the mechanism consisting in the disk D and coöperating guides, while preferably used in connection with the coöperating oppositely-rotating rollers, may be used separately without departing from the spirit of my invention. In separating or calipering some materials it is sufficient to merely use the disk and the chutes formed between the same and the guides without the oppositely-rotating rollers, while other materials may only be sufficiently graded by the coöperative action of the combined mechanisms.

From the foregoing description it will be observed that I have invented an improved machine for separating materials according to the width of the component particles, and especially adapted for separating kernels or grains whereby the normal kernels best adapted for seed are selected.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention, which consists, essentially, in a chute composed of converging surfaces one of which has a path of movement in the direction of the divergence of the surfaces.

Having now fully described my invention, what I claim as new, and desire to secure by Letters Patent, is—

1. In a machine for grading material, the combination with a standard, of a stub-shaft journaled upon said standard, means for rotating said shaft, a vertical disk fixed upon said shaft, a plurality of inclined guides supported by said standard adjacent to and spaced different distances away from one side of said disk, and means for depositing material within the upper end of the chute formed between the upper guide and said disk.

2. In a machine for grading material, the combination with a standard, of a stub-shaft journaled upon said standard, means for rotating said shaft, a vertical disk fixed upon said shaft, inclined guides supported by said standard adjacent to said disk, means for adjusting the inclination of said guides and means for varying the space between said guides and said disk.

3. In a machine for grading material, the combination with a standard, of a stub-shaft journaled upon said standard, means for rotating said shaft, a vertical disk fixed upon said shaft, brackets supported by said standard and projecting radially around said shaft, a horizontal rod adjustably supported in each bracket, a guide adjustably supported by each rod and located adjacent to said disk, whereby inclination of such guides may be adjusted and the distances thereof from said disk varied.

4. In a machine of the character described, the combination with a substantially vertical movable surface, a plurality of surfaces supported adjacent to but spaced apart from said movable surface, and means for supporting one of said inclined surfaces below the other and at a less distance from the movable surface.

5. In a machine of the character described, the combination with a rotary disk having a substantially vertical path of movement, of a plurality of inclined guides supported adjacent to but spaced apart from one side of said disk, means for supporting said guides different distances from said disk, and means for depositing material within the upper end of the chute formed between the upper guide and disk.

6. In a machine of the character described, the combination with a rotary disk having a substantially vertical path of movement, of an inclined guide supported adjacent to but spaced apart from said disk, means for depositing material within the upper end of the chute formed between said guide and disk, and a second inclined guide supported below said first guide and spaced apart from said disk a less distance than the space between the first guide and disk.

7. In a machine of the character described, the combination with a rotary disk having a substantially vertical path of movement, of an inclined guide supported adjacent to but spaced apart from said disk, means for depositing material within the upper end of the chute formed between said guide and disk, a pair of inclined oppositely-rotating rollers supported below the lower end of said chute, said rollers being spaced apart a predetermined distance and means for rotating said disk and simultaneously rotating said rollers.

8. In a machine for grading material, the combination with a standard, of a stub-shaft journaled upon said standard, means for rotating said shaft, a disk fixed upon said shaft, inclined guides supported adjacent to and spaced different distances away from said disk, inclined oppositely-rotating rollers located below said guides, and means for rotatably connecting said rollers to said stub-shaft.

In testimony whereof I sign this specification in the presence of two witnesses.

GEORGE HOEPNER.

Witnesses:
   GEO. L. WILKENSON,
   C. C. CUNNINGHAM.